United States Patent [19]

Tabara et al.

[11] 3,936,512

[45] Feb. 3, 1976

[54] PROCESS FOR MANUFACTURING A SYNTHETIC MICROFLAKE AGGREGATE

[75] Inventors: Yoshijiro Tabara; Hiroshi Akiyama; Masayuki Igawa; Tadashi Maekawa; Tokuo Shinomiya, all of Otake, Japan

[73] Assignee: Mitsubishi Rayon Co., Ltd., Japan

[22] Filed: May 6, 1974

[21] Appl. No.: 467,592

Related U.S. Application Data

[62] Division of Ser. No. 864,457, Oct. 7, 1969.

[30] Foreign Application Priority Data

Oct. 14, 1968 Japan.............................. 43-74209
Oct. 14, 1968 Japan.............................. 43-74210
July 31, 1969 Japan.............................. 44-60502
Aug. 2, 1969 Japan.............................. 44-61322
Aug. 4, 1969 Japan.............................. 44-61518

[52] U.S. Cl........... 260/897 A; 162/102; 162/168 R; 260/23 H; 260/88.2 B; 260/93.7; 260/94.9 F; 260/94.9 GD

[51] Int. Cl.²............................................. C08F 6/12

[58] Field of Search....... 260/93.7, 94.9 GD, 897 A, 260/23 H, 94.9 F; 450/775.5

[56] References Cited
UNITED STATES PATENTS

| 2,766,157 | 10/1956 | Peterson........................... 154/2.22 |
|---|---|---|
| 2,999,788 | 9/1961 | Morgan............................. 162/157 X |
| 3,047,455 | 7/1962 | Holmes et al....................... 162/157 |
| 3,080,272 | 3/1963 | Jackson............................. 161/168 R |
| 3,123,518 | 3/1964 | Bundy............................... 162/157 X |
| 3,223,581 | 12/1965 | Sommer et al...................... 162/157 R |
| 3,386,488 | 6/1968 | Ratzsch et al. .................... 159/48 |

*Primary Examiner*—Stanford M. Levin
*Attorney, Agent, or Firm*—Robert E. Burns; Emmanuel J. Lobato; Bruce L. Adams

[57] ABSTRACT

A polyolefin micro-flake aggregation which is easily micro-flakable from the aggregation into a plurality of irregularly shaped micro-flakes suitable for producing synthetic paper, is manufactured from a solution of 5 - 40% by weight of polyolefin such as polyethylene and polypropylene in a solvent such as hydrocarbons and chlorinated hydrocarbons in the presence of a surface active compound of at least 0.01% based on the weight of the polyolefin by spraying the solution which is at a temperature of at least 100°C from a closed container into atmosphere through an orifice.

A polyolefin synthetic paper is formed from a suspension of the micro-flakes in an organic liquid such as hydrocarbons and chlorinated hydrocarbons which can swell or partially dissolve the polyolefin.

17 Claims, No Drawings

PROCESS FOR MANUFACTURING A SYNTHETIC MICROFLAKE AGGREGATE

This is a division, of application Ser. No. 864,457, filed Oct. 7, 1969.

The present invention relates to a polyolefin microflake aggregation useful for manufacturing synthetic paper and polyolefine synthetic papers obtainable from the aggregation, more particularly, relates to a polyolefine micro-flake aggregation easily micro-flakable from the aggregation into a plurality of individual microflakes suitable for manufacturing synthetic paper having an appearance extremely resembling the conventional cellulosic paper and polyolefin synthetic papers obtainable from the micro-flake aggregation.

Recently, demand for paper has rapidly increased in various fields, thus, in order to meet the demand, it is required to increase supplying capacity of the paper as quickly as possible. However, owing to insufficient supplying capacities of raw material for paper manufacture, particularly, wood pulp and good water suitable for industrial use, it is very difficult to sufficiently satisfy the above-mentioned requirement.

It is required, in various practical uses, that the paper should have additional properties, such as water proofing property, printing property and tensile strength have much higher grades. But, it is very difficult for the conventional papers made of the pulp to satisfy such requirements. In order to improve the conventional pulp paper for satisfying the above requirement, the new paper making process under a dry condition and the paper improving process by addition of synthetic polymeric compounds were proposed, but these processes could not satisfactorily eliminate or imporve the disadvantages of the conventional pulp paper.

Further, a process for manufacturing the paper from synthetic polymeric compounds was proposed in order to meet the above-mentioned requirements, and the so-called synthetic papers are now practically marketable.

The synthetic papers are manufactured by the following process.

1. A synthetic film is prepared from a synthetic polymeric compound by the conventional inflation process or T-die process, and the synthetic film is modified so as to have a cellulosic paper-like surface appearance. (Hereinafter, the synthetic papers manufactured by process (1) are referred to as "film paper".)

2. A plurality of multi-filaments prepared from synthetic polymers by the conventional process are disconnectedly separated and then interlocked with each other by action of electrostatic or gaseous jetting, the interlocked multi-filaments are formed into a web by adhering at the interlocked points of the multi-filaments by an adhesion or fusing manner, and then the web is modified into a paper form. (hereinafter, the synthetic papers prepared by process (2) are referred to as "filament paper".)

3. A plurality of synthetic staple fibers manufactured from synthetic polymers by the conventional process and having a length of several millimeters or several centimeters, are dispersed by carding or gaseous jetting, the dispersed staples are blown with a gaseous stream against a paper forming surface to form a synthetic paper under a dry condition. This process is a dry paper making process.

4. The synthetic staple fibers described in process (3) are formed into a synthetic paper by the conventional wet paper making process. (Hereinafter, the synthetic papers prepared by the above-mentioned process (3) and (4) are referred to as "staple paper".)

Compared with the conventional cellulosic paper, the "film paper" prepared by the above-mentioned conventional process has the following advantages and disadvantages:

1. Advantage
   A. high water resistance,
   B. high chemical reagent resistance,
   C. high tensile strength, and
   D. good sealing property for gaseous substance.
2. Disadvantage
   A. low tear strength,
   B. difficult folding due to air non-permeability, and
   C. high manufacturing cost.

The film paper is utilized only for a specified use owing to the above-mentioned disadvantages.

The filament paper has an appearance closely resembling non-woven cloth. Therefore, a number of processing steps are necessary for making a cellulosic paper-like appearance on the filament paper. This caused high manufacturing cost, and thus, the filament paper may be utilized only for a specified use.

The conventional synthetic staple paper manufactured from synthetic polymers has the following disadvantages;

1. difficult preparation of a desirable slurry in which the staples are uniformly suspended in water owing to hydrophobic property of the synthetic staple,
2. necessary addition of a surface active agent or thickener into a suspension medium in order to overcome the disadvantage described above,
3. low tensile strength of the resultant staple paper,
4. necessity of adhering the interlocked points of the staples with an adhesive or by partial fusing of the staples in order to reinforce the tensile strength,
5. difficulty to obtain sufficient tensile strength even by the above-mentioned manner (4).

The dry paper-making process is proposed for overcoming the disadvantages presented in the wet papermaking process. However, the dry process has the various defects such as difficult forming of a paper material having a uniform thickness, necessary adhesion for reinforcing the tensile strength, undesirable appearance, and low manufacturing efficiency.

Based upon the above-stated recent circumstances in order to meet the increased demand for paper, it is greatly required to provide a synthetic paper which has an appearance and features closely resembling the conventional cellulosic paper but is independent from the natural wood material.

Main objects of the present invention are as follows;

1. to provide a polyolefin micro-flake aggregation suitable for manufacturing a synthetic paper having a hand feeling and an appearance closely resembling conventional cellulosic paper, a high water resistance, a high chemical reagent resistance, a high tensile strength and a desirable low extensibility, 2. to provide a process for directly manufacturing the polyolefin micro-flake aggregation from a polymeric solution, 3. to provide a polyolefin synthetic paper having the above-stated features and appearance, and 4. to provide a process for manufacturing the polyolefin synthetic paper from the micro-flake aggregation.

The present invention provides a polyolefin micro-flake aggregation which is easily micro-flakable from the aggregation into a plurality of micro-flakes having a thickness of 5 to 20 μ, having an irregular shape but not having a fined shape by which a synthetic paper having a cellulosic paper-like hand feeling and appearance is easily obtainable.

The present invention also provides a process for directly manufacturing the polyolefin micro-flake aggregation comprising the following steps;

a. preparing a solution by dissolving 5 to 40% by weight of at least a polyolefin at a temperature not lower than 100°C into a solvent having a boiling point not higher than the solution temperature within a closed container, in the presence of at least 0.01% based on the weight of the polyolefin of at least one surface active compound, and b. spouting or spraying the polyolefin solution containing the surface active compound from the closed container into atmosphere througn an orifice.

Further, the present invention provides polyolefin synthetic papers in which the polyolefin micro-flakes are interlocked and/or introduced to each other in random directions.

Also, the present invention includes a process for manufacturing the polyolefin synthetic paper from the polyolefine micro-flake aggregation. The process comprises the following steps;

a. micro-flaking away the polyolefin aggregation at a temperature not higher than 60°C within an organic solvent which can swell or partially dissolve the polyolefin, and b. at the same time, homogeneously suspending the polyolefin micro-flake in the organic solvent.

In the polyolefin micro-flake aggregation according to the present invention, the micro-flakes not having a fixed shape are aggregated and interlocked with each other in random directions so as to form a white globe or cylinder. The aggregation is easily micro-flakable by lightly beating.

Owing to such an easy micro-flaking property, the aggregation of the present invention is very suitable for a paper-forming process, for example, a wet cellulosic paper-forming process.

In the paper-forming process, the aggregation is easily micro-flaked by a beating operation into a suspension medium such as organic liquid by beating, and then the resultant micro-flakes are uniformly suspended in the medium so as to form a slurry usable for paper-forming.

The micro-flakes obtained from the aggregation of the present invention are unpredetermined-shaped flakes in which these shapes are highly complex, and thus, easily interlockable with each other during a paper-forming operation such as the conventional wet paper-forming and blowing against a paper-forming surface. Such an interlocking property of the micro-flakes relating to the present invention, closely resembles that of cellulose fibrils for the cellulosic paper.

The polyolefin micro-flake aggregation of the present invention is quite novel and has not been known in the past, and the synthetic sheet material, particularly, synthetic paper having an appearance and hand feeling closely resembling conventional cellulosic paper is now obtainable therewith.

The micro-flake of the present invention has a thickness of 5 to 20μ. If the thickness is smaller than 5μ, a force for maintaining a condition in which the micro-flakes are interlocked with each other is insufficient, but if the thickness is larger than 20μ, the interlockability of the micro-flakes is unsatisfactory, therefore, in both cases, the manufacturing of good quality synthetic paper is difficult.

Further, it is desirable to provide the micro-flake with a length and width of not larger than 20 mm and a specific surface area of at least 0.1 m²/g.

In case the micro-flake length is larger than 20 mm, the preparation of the uniform slurry is difficult and the interlocking property of the micro-flake is insufficient. In case the specific surface area of the micro-flake is smaller than 0.1 m²/g, the interlocking property of the micro-flake is insufficient owing to simple shape thereof.

The polyolefin micro-flakes provides with the above-defined conditions can form a synthetic sheet material, particularly, a synthetic paper having a high tensile strength the same or larger than that of the conventional cellulosic paper and a desirable tensile elongation without use of any adhesion due to its excellent interlocking property.

The polyolefin micro-flake aggregation is made of polyethylene, polypropylene, copolymers of ethylene and propylene or these mixtures, preferably polyethylene or polypropylene.

In case the aggregation is prepared from high density polyethylene, it is desirable, in our experience, that at least 50% by weight of low density polyethylene or isotactic polypropylene is mixed into the high density polyethylene.

In prior arts for example, in U.S. Pat. No. 3,081,519, it is well-known that a crystalline synthetic polymer strand having a network structure composed of a plurality of three dimensionally jointed film-like or fibrous elements can be obtained by extruding a solution of a crystalline polymeric compound in a high temperature organic solvent into a region of lower pressure through an orifice, utilizing the self-produced pressure of the solvent.

The products obtained by the process stated above, are yarn-like strands having a network structure and the strands are not micro-flakable by the general beating operation. Therefore, in order to prepare material suitable for manufacturing the synthetic paper, the strand need be cut into desired short lengths.

The term "microflake" as used herein refers to irregular three-dimensional shaped objects having one minor dimension (thickness) and two major dimensions (length and width) the "micro" prefix indicating the small size of each object. In other words, the term microflake connotes an irregularly shaped, flat chip similar to snowflakes or small soap chips. This is in contrast to fibers which have only one major dimension (length) and two minor dimensions.

The process of the present invention is valuable for directly manufacturing the polyolefin micro-flake aggregation easily micro-flakable from a polyolefin solution. The process is characterized by the presence of a surface active compound of at least 0.01% by weight based on the weight of the polyolefin in the polyolefin solution in a solvent having.

The surface active compound valuable for the present invention may be selected from the compound which can be dissolved or uniformly mixed in or with the solvent and the polyolefin, for example, anionic surface active compound such as fatty acid soaps, napthenic acid soaps, Turkey red oil, sulfuric acid fatty ester salts, higher sulfonated fatty acid ester salts, fatty acid ester sulfuric ester salts, fatty acid amide sulfuric ester salts, higher fatty alcohol sulfuric ester salts, alkyl sulfuric ester salts, alkyl sulfonic salts, alkylaryl sulfonic salts, fatty acid amide sulfonic salts, secondary alcohol sulfuric ester salts, alkyl phosphorus esters, phosphoric alkyl esters, alkyl phosphoric salts, and alkyl phenol-polyethylene glycol-sulfuric ester sodium salts; cationic surface active compound such as fatty amines, quaternary alkyl ammonium compound, basic alkyl pyridinium salts, basic alkyl picolinium salts, alkyl benzimidazole derivatives; amphoteric surface active compound such as betain-type compounds, sulfobetain-type compounds, sulfuric ester-type amphoteric compounds, and phosphoric ester-type amphoteric compounds; and non-ionic surface active compound such as polyoxyethylene alkyl esters, polyoxyethylene alkyl ethers, polyoxyethylene alkyl aryl ethers, higher alcohol fatty acid esters, polyoxyethylene sorbitan fatty acid esters, polyoxyethylene alkylamines, fatty acid alkanol amides, polyoxyethylene-polyoxypropylene block copolymers, and polyoxyethylene alkyl-thioethers.

Particularly, the non-ionic compounds as stated above are useful for the process of the present invention.

The solvent usable for the process of the present invention may be selected from the organic compound which can uniformly dissolve the polyolefin, such as aromatic hydrocarbons such as benzene, toluene and, xylene; aliphatic hydrocarbons such as butane, pentane, hexane, heptane, octane and these isomers; alicyclic hydrocarbons such as cyclohexane; chlorinated hydrocarbons such as dichloromethane, chloroform, chloroethane, tetrachloromethane, chloromethane, fluorinated compounds such as fluoro hydrocarbons; and mixtures of the above stated solvents. Particularly, the chlorinated hydrocarbons are most useful for the present invention. These solvents are required to have a boiling point not higher than the temperature of the solution to be utilized for manufacturing the polyolefin micro-flake aggregation and to not substantially react with the polyolefine and the surface active compound to be dissolved therewith.

In the process of the present invention, the polyolefin is dissolved at a temperature of at least 100°C in a concentration of 5 to 40% by weight within a closed container. Generally, the polyolefines are soluble in the above-stated solvents only at a temperature of at least 100°C. If the temperature is lower than 100°C, it is difficult to homogeneously dissolve the polyolefines into the above solvents. The dissolving operation should be carried out within the closed container because of rapid evaporation of the solvent at the temperature of 100°C or higher.

When the polyolefin is dissolved at a concentration below 5%, the resultant micro-flake can not satisfy the above-defined conditions. Also, when the polyolefin is dissolved at a concentration above 40%, it is difficult to obtain the micro-flake provided with the above-defined conditions owing to very high viscosity of the resultant solution.

The surface active compound should be mixed into the polyolefin solution at a mixing ratio of at least 0.01% based on the weight of the polyolefin. If the mixing ratio is lower than 0.01%, an endless porous strand is obtainable from the polyolefin solution, but the easily micro-flakable aggregation of the microflakes is not obtainable.

Generally, it is preferable that the mixing ratio of the surface active compound with respect to the polyolefin is 15% or smaller based on the weight of the polyolefine.

In case the mixing ratio is larger than 15%, none of the advantages are found in the resultant micro-flake aggregation, and at the same time, economical disadvantages are enlarged owing to ineffective consumption of the surface active compound.

Further, it is preferable that the surface active compound mixed in the polyolefin solution remains within the resultant micro-flake or on the surface thereof. For this purpose, the surface active compound should have a boiling point higher than the solution temperature.

The surface active compound remaining in the microflake or on the surface thereof, is valuable for desirably improving the micro-flaking property of the aggregation, antistatic property and suspending property in an organic medium of the micro-flakes, and hand feeling of the resultant synthetic paper.

The surface active compound usable for the present invention may be simultaneously dissolved in the solvent together with the polyolefin before or after the polyolefin is dissolved in the solvent.

Furthermore, it is desirable that the surface active compound is sufficiently dried into an anhydrous condition for preparing a suitable solution thereof.

Dissolving of the polyolefin and the surface active compound may be carried out by the following steps; (1) desired quantities of the solvent, the polyolefin and the surface active compound are charged into a closed container, for example, an auto-clave with a heating jacket, (2) the container is closed, and (3) the charged material is heated to a desired temperature of at least 100°C with stirring so as to pressurize the resultant solution in the closed container with the vapor produced by the solvent.

The high pressure polyolefin solution thus resulted in the closed container is sprayed into the atmosphere through an orifice.

The sprayed polyolefin solution is rapidly coagulated by the rapid evaporation of the solvent having a boiling point lower than the solution temperature, so as to form the easily micro-flakable aggregation of the polyolefin micro-flakes.

The synthetic paper of the present invention is formed by closely interlocking and/or interadhering the polyolefin micro-flakes with each other, and has a surface appearance and hand feeling closely resembling conventional cellulosic paper and a tensile strength and extensibility being the same as or more desirable than those of the conventional cellulosic paper even without application of adhesive.

Though the polyolefin micro-flakes forming the synthetic paper of the present invention are not subjected to the drawing step so-called in the artificial filament manufacturing process, the synthetic paper prepared from the polyolefine micro-flakes has a very small breaking elongation as compared with that of the conventional film paper in which the film is subjected to the drawing step in general. This is due to the fact that the tensile breaking of the paper is caused by breakage of the interlocking points and/or interadhering points of the microflakes, but not of breakage of the microflakes themselves. Such a breaking factor is identical to that of the conventional cellulosic paper.

Based upon the above-stated paper-forming factor, the synthetic paper of the present invention has a fine rugged surface valuable for printing, coating and adhering thereon.

The features and advantages of the synthetic papers of the present invention will be apparent from the ensuing description with reference to the accompanying drawings, in which:

FIG. 1 shows a stress-strain curve of an embodiment of the conventional cellulosic paper, and FIG. 2 shows stress-strain curves of a synthetic paper according to the present invention and a polypropylene film.

FIG. 1 shows a typical stress-strain curve of a cellulosic paper (high class printing paper) having a weight of 179.9 g/m² and a thickness of 69μ. The cellulosic paper has a relatively low breaking elongation of approximately 17%.

Curve I in FIG. 2 shows a stress-strain curve of the polyolefin synthetic paper of the present invention having a weight of 59.8 g/m² and a thickness of 132μ. This curve I has a shape closely resembling the curve of FIG. 1, and illustrates the fact that the synthetic paper of the present invention has a relatively lower breaking elongation of approximately 13%. Compared with curve I, curve II of FIG. 2 showing a stress-strain curve of a polyolefin film having a weight of 100 g/m² and a thickness of 100μ, illustrates the fact that the polyolefine film has a relatively higher breaking elongation of approximately 50% and an initial modulus lower than those shown in the curve of FIG. 1 and curve I.

In order to improve the tensile strength of the synthetic paper of the present invention, application of adhesives to the synthetic paper is allowable. Also, a filler, hand feeling modifying agent, coloring agent, and lustering agent may be contained in the synthetic paper.

Once again, the features and the advantages of the synthetic paper of the present invention is indicated as follow:

1. appearance and hand feeling very closely resembling those of the conventional cellulosic paper,
2. high tensile strength and desirable low tensile elongation,
3. excellent water resistance, chemical reagent resistance and corrosion resistance,
4. very light weight,
5. easy processing for printing, coating, adhering and embossing.

The synthetic papers of the present invention are usable for the same uses as those of the conventional cellulosic paper and the additional following uses:

1. building materials such as water-proof canvases, molding framework materials for cementing, materials to be buried in the ground,
2. interior materials such as curtains, blinds, paper for Japanese paper sliding doors (Shoji), paper for Japanese sliding door (Fusuma) and backing cloth for carpet,
3. interior materials for cars and ships, and
4. miscellaneous goods such as toys, umbrellas, beach parasols, bags, water-proof book covers, heat and cold retaining materials, oil-retaining paper, and water-proof packing material.

In the synthetic paper forming process in accordance with the present invention, the micro-flake aggregation of the present invention is easily micro-flakable away in an organic liquid such as hydrocarbons, chlorinated hydrocarbons at 100°C or higher and the resultant micro-flakes are homogeneously suspended in the organic liquid.

The organic liquid usable for the process of the present invention, should have a swelling or partially dissolving property for the polyolefin at a temperature not higher than 60°C, for example, aromatic hydrocarbons such as benzene, toluene, and xylene; aliphatic hydrocarbons such as hexane, heptane, octane and their isomers and homologues; alicyclic hydrocarbons such as cyclohexane, tetrahydronaphthalene, and decahydronaphthalene; alkyl halides such as dichloromethane, tetrachloromethane, chloromethane, chloroform, ethylchloride, trichloroethylene, and tetrachloroethylene; fluorinated compounds and mixtures of the above compounds.

The synthetic paper of the present invention is obtained by paper-forming according to the usual wet manner from the polyolefine micro-flake slurry and by evaporating the organic liquid from the resulting paper material. In that time, the micro-flakes are interlocked and interadhered with each other during paper-forming and evaporating of the organic liquid so as to reinforce the tensil strength of the resultant paper. The paper-forming operation may be carried out according to the conventional manner by utilizing the conventional paper-forming machine such as hand paper-making machine, cylinder mold paper-making machine or Fourdrinier-type paper-making machine. Also, the paper-forming manner usable for the present invention may contain the blowing process in which the microflake slurry is blown against a paper-forming surface.

Content of the micro-flakes in the slurry may be adjusted in response to the manner and purpose of the process. In general, the content of the micro-flakes is 0.05 to 10% by weight, preferably 0.05 to 5% by weight. Adhesive, thickener such as clay, different kinds of flakes, fiber, fibril, coloring agent, and surface active agent may be contained in the slurry of the micro-flakes.

In the paper-forming process of the present invention, the conventional drying manner such as heat-drying and vacuum-drying is usable for eliminating the organic liquid from the resultant paper.

In order to easily eliminate the organic liquid, it is required that the organic liquid have a relatively lower boiling point, a low latent heat for evaporation, low cost, an easy recovering property and hard burning property. Tetrachloromethane chloroform, and dichloromethane are satisfactory for the above requirement.

The polyolefin micro-flake aggregation of the present invention is also useful for manufacturing mold products. In such a case, the aggregation is uniformly charged into a mold and micro-flaked by beating and then the charged flakes are heated at a proper temperature in order to obtain a porous mold product.

Further, features and advantages of the present invention will be illustrated by the following examples.

EXAMPLE 1

15 parts of isotactic polypropylene having an intrinsic viscosity [η] of 2.0 in tetrahydronapthalene at 135°C and 85 parts of dichloromethane were charged into a closed auto-clave provided with a heating jacket, together with 1% of nonipol 200 (polyoxyethylene alkyl aryl ether-type non-ionic surface active compound, manufactured by Sanyo Kasei Co., Ltd., Japan) based on the weight of the isotactic polypropylene, heated to 190°C with stirring in order to dissolve the polypropylene and nonipol 200 in dichloromethane. The pressure of the gases in the auto-clave was increased to 39 kg/cm$^2$G with dichloromethane vapor produced by the heating.

The high temperature solution thus prepared was sprayed from the auto-clave into atmosphere through an orifice having a diameter of 0.5 mm and a length of 0.5 mm. The sprayed solution was coagulated by evaporation of dichloromethane, and formed a white micro-flake aggregation composed of micro-fine flakes. The resultant micro-flake aggregation was easily micro-flakable in tetrachloromethane by lightly beating the aggregation.

It was found by microscopic observation in an enlarged condition of 400 times, that the micro-flakes had an average thickness of $5\mu$, an average length of 1.0 mm, an average width of 0.5 mm and an average specific surface area of 0.22 m$^2$/g.

EXAMPLE 2 to 25

24 kinds of polyolefine micro-flake aggregations were prepared as indicated in Table 1. These aggregations were manufactured in the same manner as described in Example 1.

The features of the micro-flakes in the aggregations were as is indicated in Table 1.

Table 1

| Ex. No. | Polymer [η] or sp/c | Solvent | Surface Active Compound |
|---|---|---|---|
| 2 | Polypropylene [η] = 1.4 | Dichloromethane | A. Al. S (Na) (*1) |
| 3 | Polypropylene [η] = 1.4 | Dichloromethane | A. A. S (Na) (*2) |
| 4 | Polypropylene [η] = 1.4 | Dichloromethane | A. Naph. S (Na) (*3) |
| 5 | Polypropylene [η] = 1.4 | Dichloromethane | Na-Lauryl sulfate |
| 6 | Polyethylene η sp/c = 0.8 | Dichloromethane | Na-Lauryl sulfate |
| 7 | Polyethylene η sp/c = 0.8 | Dichloromethane | A.A.S(Na) |

| Ex. No. | Composition of Solution Polymer/Solvent | Content of Surface Active Compound (% based on the weight of polymer) | Temperature of Solution | Micro-Flake Average Thickness ($\mu$) | Micro-Flake Average Length (mm) |
|---|---|---|---|---|---|
| 2 | 20/80 | 0.5 | 199 | 18 | 1.0 |
| 3 | 18/82 | 0.7 | 180 | 20 | 1.1 |
| 4 | 18/82 | 0.5 | 192 | 18 | 1.5 |
| 5 | 15/85 | 0.1 | 195 | 8 | 1.0 |
| 6 | 18/82 | 0.5 | 198 | 7 | 8.0 |
| 7 | 20/80 | 0.2 | 198 | 20 | 1.0 |

| Ex. No. | Polymer [η] or η sp/c | Solvent | Surface Active Compound |
|---|---|---|---|
| 8 | Mixture Polyethylene: 70% η sp/c = 0.8 Polypropylene: 30% [η] = 1.4 | Dichloromethane | Na-Lauryl sulfate |
| 9 | Polypropylene [η] = 1.4 | Dichloromethane | P. OE. A. A. (*4) |
| 10 | Polypropylene [η] = 2.0 | Dichloromethane | P. OE. A. A. |
| 11 | Polypropylene [η] = 2.0 | Dichloromethane | Alkyl-benzyl ammonium chloride |

Table 1-continued

| Ex. No. | Composition of Solution Polymer/Solvent | Content of Surface Active Compound (% based on the weight of polymer) | Temperature of Solution | Micro-Flake Average Thickness ($\mu$) | Micro-Flake Average Length (mm) |
|---|---|---|---|---|---|
| 8 | 17/83 | 1.0 | 200 | 15 | 1.0 |
| 9 | 20/80 | 1.0 | 180 | 18 | 1.1 |
| 10 | 15/85 | 0.5 | 202 | 6 | 1.0 |
| 11 | 15/85 | 0.8 | 199 | 18 | 1.0 |

| Ex. No. | Polymer [η] or η sp/c | Solvent | Surface Active Compound |
|---|---|---|---|
| 12 | Polypropylene [η] = 1.4 | Dichloromethane | A. Am. S (*5) |
| 13 | Polypropylene [η] = 1.4 | Dichloromethane | A. Pr. H (*6) |
| 14 | Polypropylene [η] = 2.0 | Dichloromethane | P. A. Ether (*7) |
| 15 | Polypropylene [η] = 1.4 | Dichloromethane | P. A. Ether |
| 16 | Polypropylene [η] = 1.4 | Dichloromethane | P. A. Ether |

| Ex. No. | Composition of Solution Polymer/Solvent | Content of Surface Active Compound (% based on the weight of polymer) | Temperature of Solution | Micro-Flake Average Thickness ($\mu$) | Micro-Flake Average Length (mm) |
|---|---|---|---|---|---|
| 12 | 15/85 | 2.0 | 198 | 15 | 1.5 |
| 13 | 18/82 | 1.0 | 199 | 15 | 1.5 |
| 14 | 20/80 | 1.5 | 200 | 8 | 1.0 |
| 15 | 20/80 | 3.0 | 200 | 5 | 1.0 |
| 16 | 15/85 | 5.0 | 200 | 12 | 1.8 |

| Ex. No. | Polymer [η] or η sp/c | Solvent | Surface Active Compound |
|---|---|---|---|
| 17 | Mixture Polypropylene: 70% [η] = 1.4 Polyethylene: 30% η sp/c = 1.0 | Tetrachloromethane | P. A. P. Ether (*8) |
| 18 | Mixture Polypropylene: 70% [η] = 2.0 Polyethylene: 30% η sp/c = 0.8 | Tetrachloromethane | P. A. P. Ether |
| 19 | Polyethylene η sp/c = 1.0 | Tetrachloromethane | P. A. Ether |
| 20 | Polyethylene η sp/c = 1.0 | Dichloromethane | P. A. Ether |

| Ex. No. | Composition of Solution Polymer/Solvent | Content of Surface Active Compound (% based on the weight of polymer) | Temperature of Solution | Micro-Flake Average Thickness ($\mu$) | Micro-Flake Average Length (mm) |
|---|---|---|---|---|---|
| 17 | 18/82 | 0.05 | 200 | 6 | 8.0 |
| 18 | 20/80 | 0.9 | 200 | 12 | 1.0 |
| 19 | 19/81 | 1.0 | 199 | 10 | 1.0 |
| 20 | 14/86 | 2.0 | 200 | 12 | 1.0 |

| Ex. No. | Polymer [η] or η sp/c | Solvent | Surface Active Compound |
|---|---|---|---|
| 21 | Polyethylene η sp/c = 0.8 | Dichloromethane | P. A. Ether |
| 22 | Polypropylene [η] = 1.4 | Dichloromethane | P. A. Ether |
| 23 | Polyethylene η sp/c = 0.8 | Dichloromethane Mixture | P. A. Ether |

Table 1-continued

| Ex. No. | Polymer [η] or sp/c | Solvent | Surface Active Compound |
|---|---|---|---|
| 24 | Polypropylene [η] = 1.4 | Dichloromethane: 50% Tetrachloromethane: 50% Mixture | P. A. Ether |
| 25 | Polypropylene [η] = 1.4 | Tetrachloromethane: 50% Chloroform: 50% | P. A. P. Ether |

| Ex. No. | Composition of Solution Polymer/ Solvent | Content of Surface Active Compound (% based on the weight of polymer) | Temperature of Solution | Micro-Flake Average Thickness (μ) | Micro-Flake Average Length (mm) |
|---|---|---|---|---|---|
| 21 | 20/80 | 0.01 | 198 | 20 | 1.2 |
| 22 | 15/85 | 15 | 198 | 15 | 1.5 |
| 23 | 20/80 | 15 | 198 | 10 | 1.8 |
| 24 | 20/80 | 0.1 | 200 | 7 | 1.0 |
| 25 | 18/82 | 0.5 | 200 | 18 | 1.0 |

Note:
*1  A. Al. S (Na):   Na-higher alcohol sulfate [ROSO₃Na]

*2  A. A. S (Na):    Na-alkyl aryl sulfonate

*3  A. Naph. S (Na): Na-alkylnaphthalene sulfonate

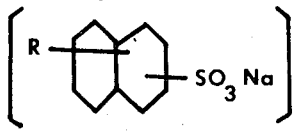

*4  P. OE. A. A.:    Polyoxyethylene alkyl amine

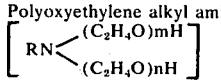

*5  A. Am. S:        Alkylamine salt [R₁NR₂R₃]⁺x⁻

*6  A. Pr. H:        Alkyl pyridinium halide

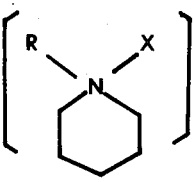

*7  P. A. Ether:     Polyoxyethylene alkyl ether [RO(C₂H₄O)nH]

*8  P. A. P. Ether:  Polyoxyethylene alkyl-phenyl ether

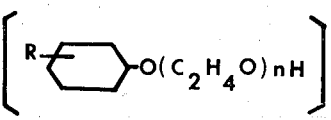

In the above-mentioned formulas, R, R₁, R₂, and R₃ represent alkyl radical, and X represents halogen atom.

The resultant micro-flake aggregations shown in Table 1 were easily micro-flakable in the solvents.

For comparison the present Example, the comparison Examples 1 to 4, as shown in Table 2, were carried out in the same manner as described in Example 1.

Table 2

| Comparison Example No. | Polymer [η] or η sp/c | Solvent | Surface Active Compound | Composition of Solution Polymer/ Solvent |
|---|---|---|---|---|
| 1 | Polypropylene [η] = 2.0 | Dichloromethane | P. A. P. Ether | 44/56 |
| 2 | Polypropylene [η] = 2.0 | Dichloromethane | P. A. P. Ether | 10/90 |
| 3 | Polyethylene η sp/c = 0.8 | Dichloromethane | P. A. P. Ether | 45/55 |
| 4 | Mixture {Polypropylene: 30% [η] = 2.0 Polyethylene: 70% η sp/c = 1.0} | Dichloromethane | P. A. P. Ether | 20/80 |

| Content of Surface Active Compound (% based on the weight of polymer) | Temperature of Solution | Product |
|---|---|---|
| 0.4 | 200 | Non-flakable endless strand having a net-work structure |
| 0.005 | 200 | Non-flakable endless strand having a net-work structure |
| 0.2 | 210 | Non-flakable endless strand having a net-work structure |
| 0.005 | 195 | Non-flakable endless strand having a net-work structure |

The resultant products were endless strands having a network structure, and not flakable by conventional beating.

EXAMPLE 26

0.3 parts of the polypropylene micro-flake aggregation obtained through the same process as stated in Example 1 was mixed into 99.7 parts of dichloromethane at 25°C and heated by way of TAPPI Standard Sheet Machine in order to obtain a homogeneous slurry. Synthetic papers having a weight od 34 g/m² and an average thickness of 79μ were formed from the slurry by way of a Fourdrinier-type paper machine.

The appearance of the resultant synthetic paper closely resembles that of the conventional middle class cellulosic papers and the tensile strength and breaking elongation were as shown in Table 3.

Table 3

| Item | Tensile Strength (kg) | Breaking Elongation (%) |
|---|---|---|
| Longitudinal | 3.64 | 12 |
| Lateral | 2.39 | 8.3 |

Note: Testing specimen for determination of tensile strength and breaking elongation was prepared in a length of 180 mm and a width of 30 mm.

For comparison with the present Example, polypropylene staple fibers having a length of 5 mm and a specific surface area of 0.11 m²/g were prepared from a polypropylene multi-filament having an individual filamentary fineness of 10 denier. The polypropylene staples were suspended in dichloromethane and paper-formed in the same manner as described above. The resultant paper had a weight of 35 g/m² and high bulkiness, but a poor tensile strength being lower than 0.8 kg, and thus, was practically unusable.

EXAMPLES 27 to 30

Polypropylene synthetic papers as shown in Table 4 were formed from the polypropylene micro-flake aggregation manufactured in the same manner as shown in Example 1.

The paper-forming process was carried out under the conditions shown in Table 4 and the resultant paper had the features as shown in Table 4.

Table 4

| Ex. No. | Slurry Content of Micro-Flake (% by weight) | Beating Time (min) | Weight (g/m²) | Paper Thickness (μ) | Tensile Strength (kg) | Breaking Elongation (%) |
|---|---|---|---|---|---|---|
| 27 | 0.3 | 3 | 40.5 | 91 | 7.21 | 58.7 |
| 28 | 0.3 | 5 | 75.5 | 116 | 2.85 | 7.5 |
| 29 | 0.1 | 2 | 151.4 | 270 | 11.6 | 7.5 |
| 30 | 0.5 | 1 | 101.0 | 120 | 4.35 | 8.1 |

Note: Tensile strength and breaking elongation were determined in a longitudinal direction.

EXAMPLE 31

A polypropylene synthetic paper was formed in the same manner as indicated in Example 26. But, 0.36 parts of Bond H-7 (Commercial name of adhesive, essentially consisting of isobutylene-isoprene rubber made by Konishi Gisuke Corp., Japan) was dissolved in the polypropylene micro-flake slurry. Tensile strength and breaking elongation of the resultant paper were as shown in Table 5.

Table 5

| Item | Tensile Strength (kg) | Breaking Elongation (%) |
|---|---|---|
| Longitudinal | 5.25 | 36.6 |
| Lateral | 5.01 | 37.2 |

The resultant polypropylene paper was laundered in water by an electric laundering machine for 10 minutes. The laundered paper had an appearance closely resembling parchment and a soft hand feeling. This soft parchment-like synthetic paper was valuable for book covering paper and interior materials.

EXAMPLES 32 and 33

Two polymeric mixtures were prepared from a high density polyethylene and an isotactic polypropylene in the mixing ratios of 3 : 7 (Example 32) and of 7 : 3 (Example 33). Each polymeric mixture (17 parts) was mixed into 87 parts of dichloromethane in the presence of Nonipol 160 (polyoxyethylene alkyl phenyl ether-type non-ionic surface active agent, manufactured by Sanyo Kasei Co., Ltd., Japan) of 0.17% based on the weight of the polymeric mixture, and then the mixture was heated to 190°C for preparing a polymeric mixture solution.

Each polymeric mixture solution was subjected to the manufacturing process of the micro-flake aggregation by the same manner as stated in Example 1. Each resultant micro-flakes had an average thickness of 7μ and an average length of 0.55 mm.

Each micro-flake aggregation was mixed into a mixture liquid which consisted of dichloromethane and tetrachloromethane in a mixing ratio of 50 : 50 at 27°C, and beaten by a stirring device for 2 minutes so as to obtain a homogeneous slurry containing 0.6% of the micro-flakes.

The desired synthetic paper was obtained from each slurry by paper-forming by way of a Fourdrinier-type paper machine and then by drying the paper at 50° to 70°C. Each resultant synthetic paper had a waxy and smooth hand feeling and a longitudinal tensile strength and breaking elongation as shown in Table 6.

Table 6

| Example No. | Tensile Strength | Breaking Elongation |
|---|---|---|
| 32 | 2.8 | 11.1 |
| 33 | 1.67 | 6.8 |

Table 6 shows that the synthetic paper of Example 32, which has a higher content of isotactic polypropylene, has a tensile strength higher than that of the synthetic paper of Example 33 which has a high content of high density polyethylene.

EXAMPLE 34

A polypropylene micro-flake aggregation prepared in the same manner as stated in Example 26, was suspended into dichloromethane so as to form a slurry. A linter pulp having a length of 5 mm of 0.17% based on the weight of the aggregation was further suspended into the slurry. The slurry thus obtained was subjected to a paper-forming process in the same manner as stated in Example 26. The resultant polypropylene synthetic paper was very bulky and was provided with the features as indicated in Table 7.

Table 7

| Item | | Value |
|---|---|---|
| Weight (g/m²) | | 55.8 |
| Thickness (μ) | | 307 |
| Tensile Strength | Longitudinal | 1.07 |
| | Lateral | 1.07 |
| Breaking Elongation | Longitudinal | 3.9 |
| | Lateral | 3.0 |

EXAMPLE 35

A mixture composed of 10 parts of high density polyethylene, 0.6 parts of linter pulp having a length of 2 mm, 89.3 parts of dichloromethane and 0.1 part of Newpol E (polyoxyethylene alkyl ether-type non-ionic surface active agent, made by Osaka Kagaku Co., Japan) was heated to 180°C for preparing a high temperature high pressure polymeric solution. The resultant polymeric solution. The resultant polymeric solution was spurted through an orifice in the same manner as described in Example 1 in order to obtain the high density polyethylene micro-flake aggregation. The obtained aggregation was easily micro-flakable.

The resultant micro-flakes were provided with an average thickness of 10μ, an average length of 3 mm, an average width of 1 mm and an average specific surface area 0.2 m²/g.

The aggregation was mixed into a mixture of tetrachloromethane and methanol (9 : 1) at 20°C and beaten by way of a stirring device having a rotation of 1700 rpm for 3 minutes so as to prepare a homogeneous slurry containing 0.1% by weight of the microflakes. The resultant slurry was subjected to the synthetic paper-forming process as stated in Example 26.

The obtained polyethylene synthetic paper had a moisture regain of approximately 6% under a standard condition wherein, temperature was 20°C and relative humidity 67%. Further, the synthetic paper was dyeable with direct dye, for example, Japanol Brilliant Blue 6 BKX (manufactured by Sumitomo Chemical Co., Japan).

What we claim is:

1. A process for manufacturing a synthetic micro-flake aggregate useful for producing a paper-like synthetic sheet, comprising
   a. preparing, in a closed container, a solution at a temperature not lower than 100°C, containing 5 to 40 weight percent of at least one polyolefin in an organic solvent capable of dissolving said polyolefin and having a boiling point not higher than said temperature of said solution at normal pressure, in the presence of 0.01 to 15%, based on the weight of said polyolefin, of at least one surface active compound,
   b. spraying said polyolefin solution from said closed container through an orifice into an atmosphere maintained at a lower pressure than the pressure of said solution in said closed container, and
   c. rapidly evaporating said organic solvent from said sprayed solution, whereby said solution is finely divided and converted to an aggregate of numerous irregular shaped micro-flakes.

2. A process as claimed in claim 1, wherein said polyolefin is polypropylene.

3. A process as claimed in claim 1, wherein said polyolefin is polyethylene.

4. Process as claimed in claim 1, wherein said polyolefin is a mixture of polyethylene and polypropylene.

5. A process as claimed in claim 1, wherein said surface active compound is selected from anionic surface active compounds.

6. A process as claimed in claim 5, wherein said anionic compound is selected from the group consisting of fatty acid soaps, naphthenic acid soaps, Turkey red oil, sulfuric acid fatty ester salts, sulfonated fatty acid ester salts, fatty acid ester sulfuric ester salts, fatty acid amide sulfuric ester salts, fatty alcohol sulfuric ester salts, alkyl sulfuric ester salts, alkyl sulfuric salts, alkylaryl sulfuric salts, fatty acid amide sulfuric salts, secondary alcohol sulfuric ester salts, alkyl phosphorous ester, phosphoric alkyl esters, alkyl phosphoric salts and alkyl phenol-polyethylene glycol sulfuric ester salts.

7. A process as claimed in claim 1, wherein said surface active compound is selected from cationic surface active compounds.

8. A process as claimed in claim 7, wherein said cationic compound is selected from the group consisting of fatty amines, quaternary alkyl ammonium compounds, basic alkyl pyridinium salts, basic alkyl picolinium salts and alkyl benzimidazoles.

9. A process as claimed in claim 1, wherein said surface active compound is selected from non-ionic surface active compounds.

10. A process as claimed in claim 9, wherein said non-ionic compound is selected from the group consisting of polyoxyethylene alkyl esters, polyoxyethylene alkyl ethers, polyoxyethylene alkylaryl ethers, alcohol fatty acid esters, polyoxyethylene sorbitan fatty acid esters, polyoxyethylene alkylamines, fatty acid alkanol amides, polyoxyethylene-polyoxypropylene block copolymers and polyoxyethylene alkylthioethers.

11. A process as claimed in claim 1, wherein said surface active compound is selected from amphoteric surface active compounds.

12. A process as claimed in claim 11, wherein said amphoteric surface active compound is selected from the group consisting of betain amphoteric compounds, sulfobetain amphoteric compounds, sulfuric ester amphoteric compounds and phosphoric ester amphoteric compounds.

13. A process as claimed in claim 1, wherein said organic solvent is selected from the group consisting of aromatic hydrocarbons, aliphatic hydrocarbons, alicyclic hydrocarbons, chlorinated hydrocarbons, fluorinated hydrocarbons, and mixtures of two or more of the above-mentioned compounds.

14. A process as claimed in claim 13, wherein said aromatic hydrocarbon is selected from the group consisting of benzene, toluene and xylene.

15. A process as claimed in claim 13, wherein said aliphatic hydrocarbon is selected from the group consisting of butane, pentane, hexane, heptane, octane, and isomers thereof.

16. A process as claimed in claim 13, wherein said alicyclic hydrocarbon is cyclohexane.

17. A process as claimed in claim 13, wherein said chlorinated hydrocarbon is selected from the group consisting of dichloromethane, chloroform, chloroethane, tetrachloromethane and chloromethane.

* * * * *